United States Patent [19]
Buluschek

[11] Patent Number: 5,744,779
[45] Date of Patent: Apr. 28, 1998

[54] METHOD FOR MANUFACTURING DRIP IRRIGATION TUBES

[75] Inventor: Bruno Buluschek, Echandens, Switzerland

[73] Assignee: E. Kertscher S.A., Yvonand, Switzerland

[21] Appl. No.: 568,135

[22] Filed: Dec. 6, 1995

[30] Foreign Application Priority Data

Dec. 7, 1994 [FR] France ................................ 94 14712

[51] Int. Cl.⁶ .................................................. B23K 26/00
[52] U.S. Cl. ................................ 219/121.71; 239/542
[58] Field of Search .......................... 219/121.7, 121.71; 29/890.14; 239/542; 138/42, 43; 156/64, 244.13

[56] References Cited

U.S. PATENT DOCUMENTS

| | | | |
|---|---|---|---|
| 3,874,598 | 4/1975 | Havens | 239/542 |
| 4,095,084 | 6/1978 | Shutt | 219/121.85 |
| 5,022,940 | 6/1991 | Mehoudar | 239/542 |
| 5,181,659 | 1/1993 | Ohe | 219/121.71 |
| 5,282,916 | 2/1994 | Bloom | 239/542 |
| 5,324,371 | 6/1994 | Mehoudar | 239/542 |

FOREIGN PATENT DOCUMENTS 2389447  12/1978  France.

*Primary Examiner*—Geoffrey S. Evans
*Attorney, Agent, or Firm*—Sughrue, Mion, Zinn, Macpeak & Seas, PLLC

[57] ABSTRACT

A continuous tube (1) is prepared by extrusion of a plastic material. Flow regulators or "drips" (4) are welded at intervals onto its internal wall, said drips comprising a collecting chamber, which is provided on the face turned towards the tube (1), and connected, by a narrow passage, to the interior of the tube. The tube is moved continuously in front of a non contact detector, preferably a capacitive sensor (40) which detects the beginning or the end of the passing of a flow regulator before it. One thus controls, as a function of the detector signals, perforation in the wall of the tube, of a hole connecting the collecting chamber to the exterior, with the aid of a laser (42), preferably a Nd:YAG laser and a focusing optic (44).

10 Claims, 1 Drawing Sheet

U.S. Patent    Apr. 28, 1998    5,744,779
FIG. 1
FIG. 2
FIG. 3
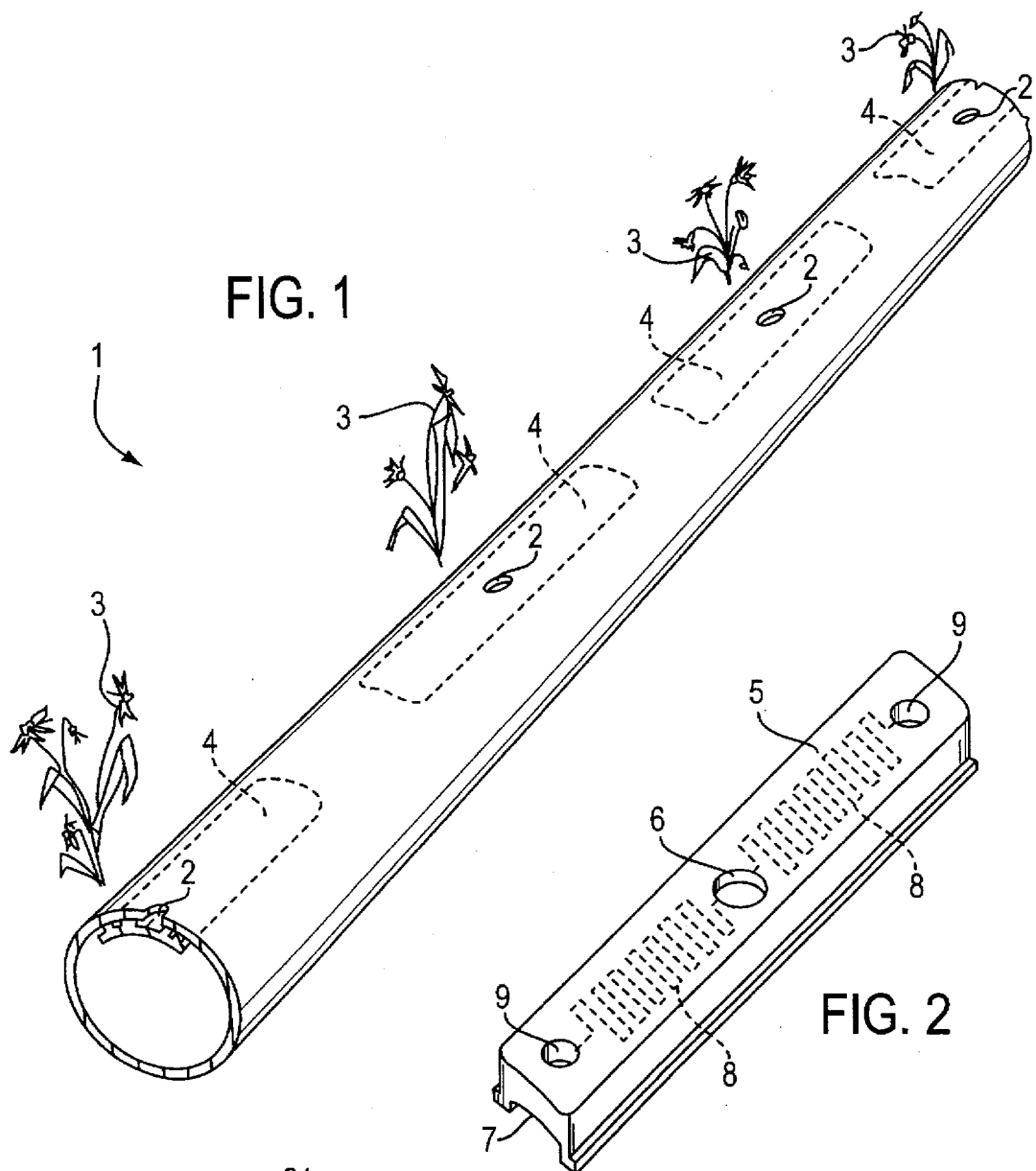
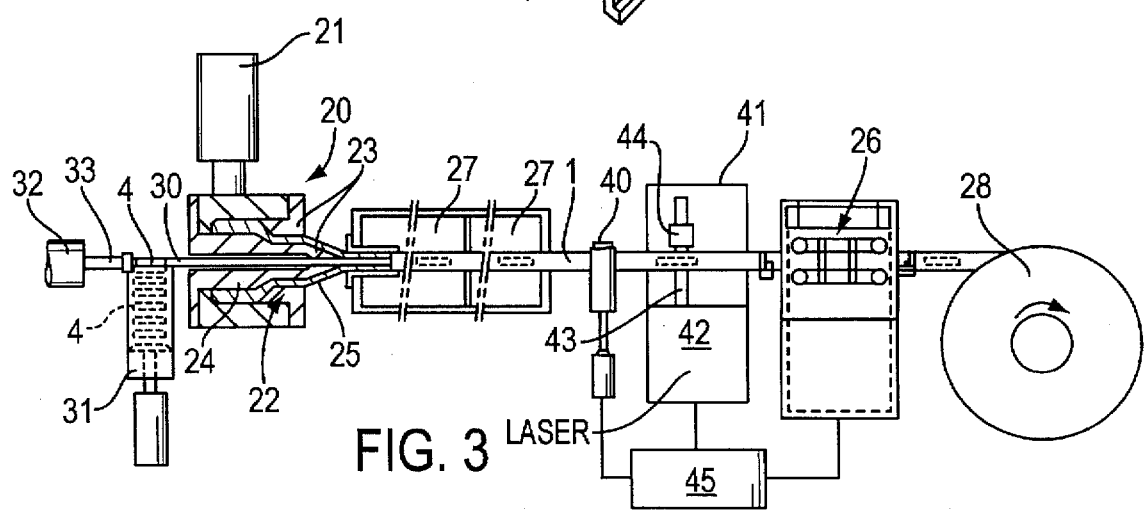

METHOD FOR MANUFACTURING DRIP IRRIGATION TUBES

BACKGROUND OF THE INVENTION

The present invention relates to a method for manufacturing drip irrigation tubes.

It is a common technique to use so called "drip" tubes for certain types of irrigation. This concerns tubes whose wall is perforated, at pre-determined intervals, by holes of small diameter, through which the water flows into the ground. In order to control the flow through the holes with precision, a flow regulator is provided, commonly called a dripper unit, which comprises a part in a plastic material, which is glued to the internal wall of the tube. This part has, on the side turned towards the internal wall of the tube a hollow part, which forms a collecting chamber. This collecting chamber is connected to the internal space of the tube by a predetermined loss of head conduit, for example, a labyrinth conduit. This labyrinth is formed by a preprepared groove on the face of the dripper unit which is intended to be turned towards the internal face of the tube.

In practice, in most cases, an irrigation tube of this type is manufactured in the following manner:

Polymer, generally polyethylene, is fed into an extrusion device and the latter produces, via a shaping head a continuous tube in the required dimensions. As soon as the tube comes out of the extrusion head, and is still warm, a dripper unit, which is brought through the extrusion head, is pressed against the internal wall of the tube and adheres to the latter by melting locally.

Once the tube-drip assembly has cooled in a water tank, a hole is made though the wall of the tube, at a location facing the collecting chamber. Nowadays this operation is carried out in the following manner:

In order to be able to perforate in the correct place, one has to be able detect the beginning of a dripper unit in the tube. Given that the tube is thicker at the place where the dripper unit is situated than the thickness of the tube alone, one can detect the beginning of the dripper unit in the tube by compressing the thin walled tube by mechanical means, for example between two rollers pressed against each other by a spring. As soon as a dripper unit passes between the rollers, the latter have to move in order to make room for the dripper unit. This movement is detected by an electric sensor and used as a signal for a drilling machine which will drill the opening in the tube in order to create a passage between the interior of the tube via the dripper unit to the exterior.

The drilling of an opening in the tube is then carried out by conventional mechanical means (drill and drilling machine).

As the detection of the presence of a dripper unit requires movement of a mechanical member having a given weight, the inertia of this member limits the speed and precision of the detection of the beginning of the dripper unit.

Drilling takes a certain amount of time. Given that the tube moves forward during this time, the drilling system must, during the drilling time, follow the tube at the same speed as the latter. A complicated and costly apparatus is consequently required.

Further, it must be observed that drilling is an operation in which material is removed, either a disk corresponding to the hole, or chips. The removal of this material cannot be 100% assured, from which arise frequent halts in production. It is to be noted that a polymer, or more precisely the polyethylene used for these tubes, is more difficult to drill than for example, a metal: polyethylene melts easily in the heat created by the friction of the drill and "freezes" on the tool which, afterwards, will no longer cut.

SUMMARY OF THE INVENTION

An object of the present invention is to remove or at least reduce these disadvantages, and to provide a simple system which enables high output levels to be obtained during manufacturing of "drip" irrigation tubes.

In order to obtain this result, the invention provides a method for manufacturing drip irrigation tubes, comprising the following steps of:

providing a continuous tube by extrusion, welding onto the internal wall of the tube a flow regulator comprising a watertight wall which defines with the internal wall of the tube a collecting chamber connected to the interior space of the tube by a predetermined loss of head conduit, and perforating the wall of the tube so that said collecting chamber communicates with the exterior.

this method being characterised in that, in order to perforate the wall of the tube, one uses a contactless detector able to detect the beginning and/or end of a flow regulator passing before it when the tube moves longitudinally in relation to said detector, and one uses a laser for perforating the wall of the tube at a location facing the collecting chamber.

The invention will now be explained in more detail with the aid of a practical example, illustrated by the drawings, in which:

BRIEF DESCRIPTION OF THE DRAWINGS

FIG. 1 is a schematic perspective view of an irrigation tube which may be obtained by the method of the invention, FIG. 2 is a perspective view of a dripper unit seen from above, before being installed in the irrigation tube, and FIG. 3 is a schematic view of an installation for manufacturing irrigation tubes, this installation being in conformity with the invention.

DESCRIPTION OF PREFERRED EMBODIMENTS

FIG. 1 shows a watering tube 1, in a plastic material, for example polyethylene, which contains, at regular intervals, holes 2, through which the water can flow to water vegetables 3. In proximity to holes 2, inside the tube, and thus not visible from the exterior are placed dripper units 4, whose structure is explained with the aid of FIG. 4. Before being installed, the dripper unit is a part in a plastic material, theoretically of the same composition as tube 1, although this is not obligatory. Dripper unit 4 has an elongated parallelepiped shape, with an "external" surface 5, which has, in cross-section, a curved shape corresponding to the curve of the internal wall of tube 1. A collecting chamber 6 is cut into said surface 5, said chamber being situated substantially in the centre part of surface 5, and not reaching the opposite face of the dripper unit. As shown in FIG. 2, two channels 8 are cut into surface 5, connecting collecting chamber 6 to two passages 9, which are each situated towards an end of dripper unit 4, and which cross the drip, to open out onto the opposite or internal face 7.

In the finished tube, dripper unit 4 is welded, or preferably thermo-welded, along its entire external surface 5, to the internal face of tube 1. Hole 2, which goes through the wall of tube 1, opens into collecting chamber 6. It will be understood that the water contained inside tube 1, flows to the exterior by passing though passages 9, conduits 8, collecting chamber 6 and holes 2.

Referring now to FIG. 3, it will be noted that the apparatus for manufacturing tube 1 comprises an extrusion apparatus 20, comprising a chamber 21 for melting the plastic material, which feeds an assembly 22 provided with a die 23, inside which is provided a conical mandrel 24, arranged so that a rough tubular form 25 comes out of the die.

Rough tubular form 25 is drawn by a traction device 26, passing though cooling and gauging chambers 27. Beyond pulling device 26, the tube is rolled onto a drum 28.

This is a conventional arrangement in the manufacture of plastic tubes.

In order to attach the dripper units, mandrel 24 is provided with an axial passage inside which a guide bar 30 is arranged. This guide bar receives dripper units 4 from a feed device 31.

A movement device 32, provided with a push rod 33, is arranged to feed dripper units 4 up into cooling and gauging devices 27. The dimensions of guide bar 30 are calculated so that, at this point, rough tubular form 25, whose diameter is reduced by this device, comes into contact with the dripper unit at the time when it is still paste-like, which assures thermo-welding of upper face 5 of the dripper unit with the internal wall of the rough tube form. An arrangement of this type is already known.

Upon exiting cooling and gauging devices 27, tube 1 encounters a detector 40, sensitive to the variation in electric capacity resulting from the arrival of a dripper unit under its detective cell.

Detector 40 is of a known type, its sensitivity must be adapted to the nature of the material in which the dripper unit is made. One will mention in this regard that the dielectric constant of polyethylene differs from that of air by a factor of 2.3. This significant difference enables a large number of commercial detectors to be used such as that marketed for example by the Baumer company of Frauenfeld, Switzerland.

After passing detector 40, tube 1 enters a perforating device 41, which comprises a laser 42 connected by an optic fibre 43 to a focusing optic 44.

A control member 45 is connected on the one hand to pulling or driving device 26 and on the other hand to detector 40. From the data provided by these two members and the information concerning the dimensions of the drip, or more precisely the distance between the front end, in the direction of movement, of dripper unit 4, and the centre of collecting chamber 6, it calculates the moment in which said collecting chamber will be facing the optic 44. It then activates the emission of the laser beam.

The use of a laser for perforating, cutting and welding, is known and often used in the metal industry. The physical effect is that the coherent light is partially absorbed by the surface of the object. This absorbed energy heats the object locally and causes it to fuse locally if the energy is sufficiently great.

The polyethylene used for irrigation tubes is not a priori suitable for a method of this type since the absorption coefficient is very low. Polyethylene is transparent in the long wave of most existing lasers.

Pure polyethylene is not used for manufacturing irrigation tubes because it is not sufficiently resistant to the ultraviolet rays of the sun to which they are constantly exposed. To combat this effect, carbon black is added as stabiliser against the ultraviolet rays.

A polyethylene containing a few tenths of a percent of carbon black has an absorption coefficient in the wavelengths of a laser, for example of the Nd/YAG type which is sufficiently large for the energy of the light to be transformed into heat in an adequate manner.

The heat released by the impact of the laser beam on the wall of tube 1 must be sufficient to make a hole and to volatilize the corresponding material of the wall. Consequently, no solid waste material remains. However, this heat must not be so strong that it damages the dripper unit itself at the moment of opening a direct communication between collecting chamber 6 and opposite face 7 of the drip.

Several artifices may be used to reduce the risk of this happening, while still obtaining in each case proper perforation; one may arrange, for example, for optic 44 to comprise a lens converging strongly upon the wall of tube 1. The opposite wall forming the base of collecting chamber 6 which is set apart from the focal plane of the lens converging strongly upon the wall of tube 1 will then receive a less concentrated quantity of light. One may also arrange for the dripper unit to contain less carbon black or to be in a different material more transparent to laser beams. One could also deposit a reflecting substance on the base of the collecting chamber.

As a general rule, such artifices are not necessary, if the features of tube 1 are kept within sufficiently strict tolerances, provided that the energy brought by the laser when each hole is perforated is carefully chosen.

In current technology, the speed at which tubes are obtained is limited to around 80 meters per minute, due to the fact that mechanical drilling barely enables a speed of 200 holes per minute to be exceeded. The device of the invention enables the perforating rate to be at least doubled, and also enables the extrusion speed to be doubled, without producing inconvenient solid waste as in the prior art.

At high tube movement speeds, the holes made according to the invention may be slightly elongated. If this is inconvenient, it is possible to avoid this by providing, for example, in optic 44, a deflecting mirror synchronised with the perforating the hole. This simple technique enables one to avoid having to use a laser supplying the same quantity of energy in a shorter period of time, that is to say a more powerful and thus more costly laser.

In accordance with a simplified version, the optic is placed behind, in the direction of movement, detector 40, at a distance substantially equal to that which separates the front end of a dripper unit from its collecting chamber, and the signal emitted by detector 40 directly and immediately controls the emission of the laser energy to make the hole. The speed of movement of the tube no longer needs to be taken into account. Alternatively, optic 44 may be placed in front of detector 40, the laser then being controlled by a signal corresponding to the end of the passing of a dripper unit before the detector.

Preferably, one uses, as contactless detector, a capacitive sensor sensitive to the variation in capacity caused by the arrival of a flow regulator.

In a improved version, which enables high tube movement speeds and many variations in the latter, the tube is moved at a more or less constant speed, this speed is measured, and the moment of perforation is determined taking into account the moment of detection of the beginning and/or the end of the passing of a flow regulator, the tube movement speed, the distance between the ends of the flow regulator and its collecting chamber, and the relative position of the detector and the perforating station.

In a simplified version, one uses a perforating station situated at a distance from the detector equal to the space between the front or rear end of the flow regulator in the direction of movement of the tube, and perforation is carried out immediately after the detector has signalled the beginning or the end of the flow regulator passing before it.

It is to be noted that, in this case, the thermal inertia of the material to be volatised in order to make the hole requires that the distance between the detector and the perforating station differs from the space between the ends of the dripper unit and the collecting chamber and the corrective term depends upon the tube movement speed, so that this method is less flexible that the preceding one.

Preferably, in a practical embodiment, the tube is made of a polyethylene containing carbon black, and the laser is a Nd:YAG laser.

What is claimed is:

1. A method for manufacturing drip irrigation tubes, comprising the following steps of:

providing a continuous tube by extrusion, said tube having an interior space delimited by a wall having an internal face, welding onto said internal face of said wall of the tube a flow regulator comprising a watertight wall which defines with said internal face a collecting chamber connected to said interior space of the tube by a regulated discharge conduit, and perforating said wall of the tube so that said collecting chamber communicates with the exterior, wherein in order to perforate the wall of the tube, a contactless detector is used, able to detect the beginning of a flow regulator passing in front of it when the tube moves longitudinally in relation to said detector, and a laser is used for perforating the wall of the tube at a location facing the collecting chamber.

2. A method according to claim 1, wherein a capacitive sensor sensitive to the variation in capacitance caused by the arrival of a flow regulator, is used as contactless detector.

3. A method according to claim 1, wherein the tube is moved at a constant speed, this speed is measured, and the moment for perforating the hole is determined taking account of the moment of detection of the beginning of the passing of a flow regulator, the tube movement speed, the distance between the ends of the flow regulator and its collecting chamber, and the relative position of the detector and the perforating station.

4. A method according to claim 1, wherein one uses a perforating station situated behind said detector in the direction of movement of the tube at a distance from the detector equal to the distance between the front of the flow regulator from its collecting chamber and perforation is carried out immediately after the detector has signalled the front end of the flow regulator.

5. A method according to claim 1, wherein the tube is made of polyethylene containing carbon black and the laser is a Nd:YAG laser.

6. A method for manufacturing drip irrigation tubes, comprising the following steps of:

providing a continuous tube by extrusion, said tube having an interior space delimited by a wall having an internal face, welding onto said internal face of said wall of the tube a flow regulator comprising a watertight wall which defines with said internal face a collecting chamber connected to said interior space of the tube by a regulated discharge conduit, and perforating said wall of the tube so that said collecting chamber communicates with the exterior, wherein in order to perforate the wall of the tube, a contactless detector is used, able to detect the end of a flow regulator passing in front of it when the tube moves longitudinally in relation to said detector, and a laser is used for perforating the wall of the tube at a location facing the collecting chamber.

7. A method according to claim 6, wherein a capacitive sensor, sensitive to the variation in capacitance caused by the arrival of a flow regulator, is used as the contactless detector.

8. A method according to claim 6, wherein the tube is moved at a constant speed, this speed is measured, and the moment for perforating the hole in a perforating station is determined taking account of the moment of detection of the end of the passing of a flow regulator, the tube movement speed, the distance between the ends of the flow regulator and its collecting chamber, and the relative position of the detector and the perforating station.

9. A method according to claim 6, wherein the perforating step occurs in a perforating station situated before said detector in the direction of movement of the tube at a distance from the detector equal to the distance between rear end of the flow regulator from its collecting chamber, and perforation is carried out immediately after the detector has signalled the rear of the flow regulator.

10. A method according to claim 6, wherein the tube is made of polyethylene containing carbon black, and the laser is a Nd:YAG laser.

* * * * *